US007751422B2

(12) United States Patent
Narayanan

(10) Patent No.: US 7,751,422 B2
(45) Date of Patent: Jul. 6, 2010

(54) GROUP TAG CACHING OF MEMORY CONTENTS

(75) Inventor: Vimal Venkatesh Narayanan, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 929 days.

(21) Appl. No.: 11/498,581

(22) Filed: Aug. 3, 2006

(65) Prior Publication Data

US 2007/0230491 A1 Oct. 4, 2007

(30) Foreign Application Priority Data

Mar. 29, 2006 (IN) .......................... 877/DEL/2006

(51) Int. Cl.
*H04J 3/26* (2006.01)
*H04L 12/28* (2006.01)
*H04L 12/56* (2006.01)
(52) U.S. Cl. ........................................ 370/432; 370/412
(58) Field of Classification Search ................. 370/422, 370/429, 428, 363, 412, 432
See application file for complete search history.

(56) References Cited

U.S. PATENT DOCUMENTS

| 2002/0027909 | A1* | 3/2002 | Brinkerhoff et al. | ........ | 370/389 |
| 2003/0140196 | A1* | 7/2003 | Wolrich et al. | .............. | 711/118 |
| 2004/0006725 | A1 | 1/2004 | Lakshmanamurthy et al. | | |

OTHER PUBLICATIONS

IEEE Std 802.3, Mar. 8, 2002, Revision of IEEE, STD 802.3, 2000 Edition, 802.3: IEEE Standard for Information Technology—Telecommunications and information exchange between systems—Local and metropolitan area networks—Specific requirements, Part 3: Carrier Sense Multiple Access with Collision Detection (CSMA/DC) Access Method and Physical Layer Specifications, 387 pgs.
The ATM Forum Technical Committee, ATM-MPLS Network Interworking, Version 1.0, 23 pgs., Aug. 2001.
Intel XScale Core, Developer's Manual, 220 pgs., Dec. 2000.

\* cited by examiner

*Primary Examiner*—Derrick W Ferris
*Assistant Examiner*—Maharishi Khirodhar
(74) *Attorney, Agent, or Firm*—Grossman, Tucker, Perreault & Pfleger, PLLC

(57) ABSTRACT

A method according to one embodiment may include receiving one or more packets from at least one external device and storing one or more packets in at least one queue in memory, the memory includes a plurality of queues and a plurality of queue descriptors having pointer information to point to a queue. The method may also include grouping a plurality of queues to form a group of queues; generating a group tag that associates the group of queues; storing said group tag in a register in a content addressable memory (CAM); and mapping the queue descriptors for each queue in the group of queues into a queue array, the group tag may point to more than one of the queue descriptors in the queue array. Of course, many alternatives, variations, and modifications are possible without departing from this embodiment.

28 Claims, 11 Drawing Sheets

GROUP TAG CACHING OF MEMORY CONTENTS

CROSS-REFERENCE TO RELATED APPLICATIONS

This application claims priority to the Indian Application serial no. 877/DEL/2006 filed Mar. 29, 2006.

FIELD

The present disclosure relates to group tag caching of memory contents.

BACKGROUND

Networks enable computers and other devices to communicate. For example, networks can carry data representing video, audio, e-mail, and so forth. Typically, data sent across a network is divided into smaller messages known as packets. By analogy, a packet is much like an envelope you drop in a mailbox. A packet typically includes "payload" and a "header". The packet's "payload" is analogous to the letter inside the envelope. The packet's "header" is much like the information written on the envelope itself. The header can include information to help network devices handle the packet appropriately. For example, the header can include an address that identifies the packet's destination.

A given packet may "hop" across many different intermediate network devices (e.g., "routers", "bridges" and "switches") before reaching its destination. These intermediate devices often perform a variety of packet processing operations. For example, intermediate devices often perform address lookup and packet classification to determine how to forward a packet further toward its destination or to determine the quality of service to provide. Typically, an intermediate device features a number of different interfaces that connect to the intermediate device to other network devices.

Many network devices may temporarily store packets in memory and access memory to retrieve the packets. To access these packets, memory read and write operations may need to be performed. However, many network devices may be limited in terms of the memory locations that can be accessed in a given clock cycle. Thus, many network devices may require additional clock cycles to read and write packets to and from memory.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1:
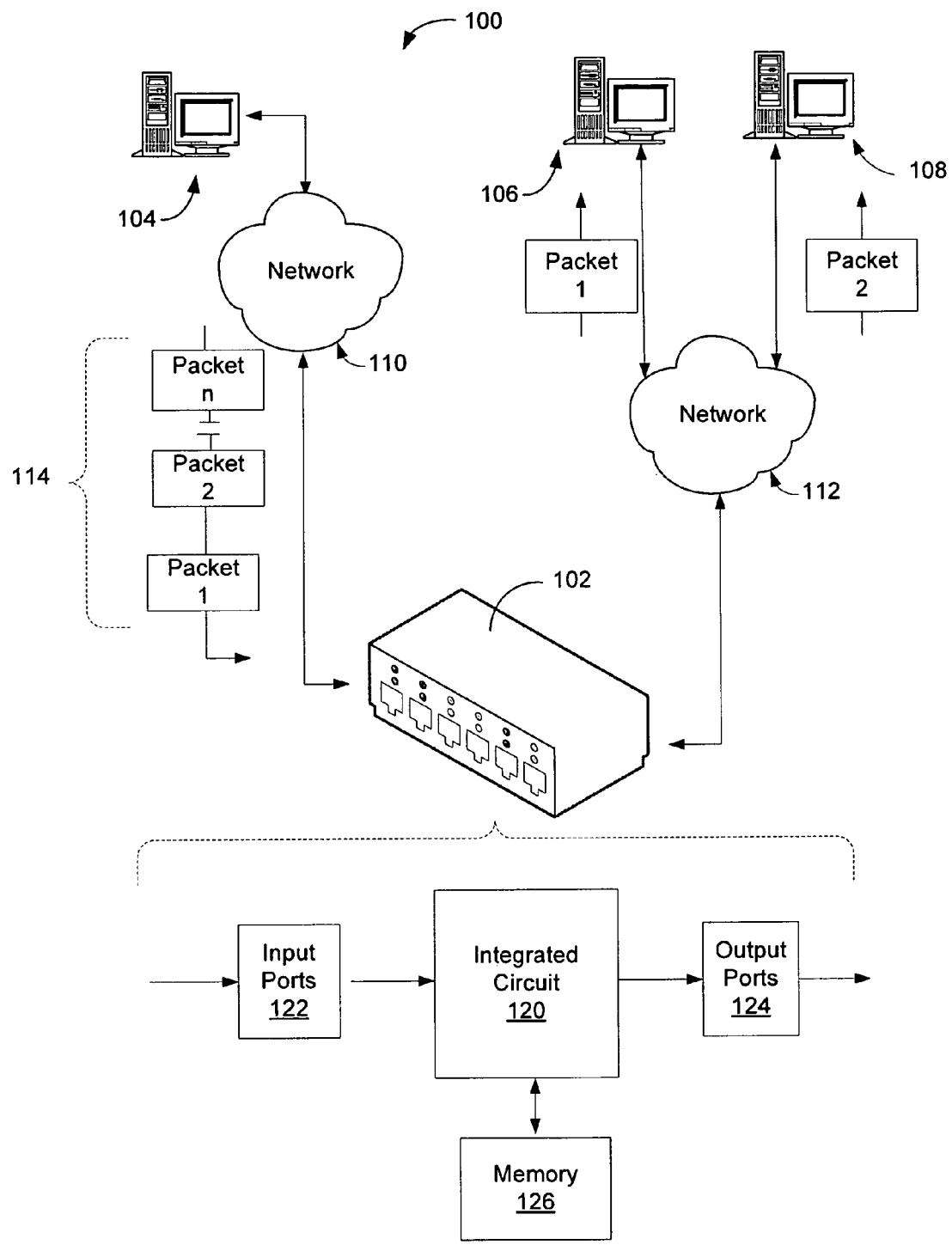
FIG. 1 is a diagram illustrating a system embodiment.

FIG. 1 illustrates a system embodiment 100 of the claimed subject matter. The system 100 may generally include a network device 102, which may be capable of communicating with one or more external devices 104, 106 and/or 108, via one or more networks 110 and/or 112. In this embodiment, external devices 104, 106 and 108 may comprise, for example, one or more network node elements which, in turn, may individually and/or collectively comprise one or more computer systems. A "network device", as used in any embodiment herein, may comprise for example, a switch, a router, a hub, and/or a computer node element, and/or similar device capable. "Network" (for example network 110 and/or 112), as used in any embodiment herein, may comprise a local area network (LAN), a wide area network (WAN), the Internet, etc.

System 100 may be capable of transmitting data packets or cells from a computer system 104 through a network 110 to other computer systems 106, 108 by way of another network 112. A "data packet" may include payload portion and a header portion. A "cell" may also include a payload portion and a header portion, but may be formatted different from a packet, depending on, for example, the communication protocol used by system 100. The term "packet" may be used herein to refer to a data packet and/or a cell to describe a sequence of symbols that includes a data payload portion and a header portion. Switch 102 may be capable of collecting a stream of "n" packets 114 and scheduling delivery of one or more packets to one or more destinations. Destination information may be provided by the individual packet. For example, information stored in the "header" of Packet 1 may be used by network device 102 to send the packet through network 112 to computer system 108 while "header" information stored in Packet 2 may be used to send Packet 2 to computer system 106.

Network device 102 may comprise integrated circuit (IC) 120, one or more input ports 122 and one or more output ports 124. "Integrated circuit", as used in any embodiment herein, means a semiconductor device and/or microelectronic device, such as, for example, but not limited to, a semiconductor integrated circuit chip. Input ports 122 may provide a physical link to network 110, and output ports 124 may provide a physical link to network 112. The integrated circuit 120 may include a network processor capable of receiving, processing and transmitting packets. In this particular example, integrated circuit 120 may receive a stream of "n" packets 114, via one or more input ports 122, and transmit one or more of the packets via one or more output ports 124. Although this embodiment depicts integrated circuit 120 within the network device 102, integrated circuit 120 may additionally and/or alternatively be included in, for example, a computer node element 104, 106 and/or 108. To that end, the operative circuitry of integrated circuit 120 may be integrated within one or more integrated circuits of a computer node element, for example, integrated into a host processor (which may comprise, for example, an Intel® Pentium® microprocessor that is commercially available from the Assignee of the subject application) and/or chipset processor.

System 100 may comprise a packet switched network. Integrated circuit 120 may be capable of communicating with one or more external devices 104, 106 and/or 108 using a selected packet switched network communications protocol. One exemplary communications protocol may include an Ethernet communications protocol which may be capable permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in March, 2002 and/or later versions of this standard. Alternative or additionally, integrated circuit 120 may be capable of communicating with one or more external devices 104, 106 and/or 108 using an X.25 communications protocol. The X.25 communications protocol may comply or be compatible with a standard promulgated by the International Telecommunication Union-Telecommunication Standardization Sector (ITU-T). Alternatively or additionally, integrated circuit may be capable of communicating with one or more external devices 104, 106 and/or 108 using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, integrated circuit 120 may be capable of communicating with one or more external devices 104, 106 and/or 108 using an Asynchronous Transfer Mode (ATM) communications protocol. The ATM communications protocol may comply or be compatible with an ATM standard published by the ATM Forum titled "ATM-MPLS Network Interworking 1.0" published August 2001, and/or later versions of this standard. Of course, different and/or after-developed communication protocols are equally contemplated herein.

In operation, and as an overview, as the packets are received, integrated circuit 120 may store one or more of packets in one or more queue locations in memory 126. Alternatively or additionally, one or more of the packets are stored separately in a storage device (e.g., a hard drive, CR-ROM, etc., not shown). By storing the packets in memory 126, the integrated circuit 120 may access the memory to retrieve one or more packets, for example, to verify if a packet has been lost in transmission through network 110, 112, and/or to determine packet destinations, and/or to prioritize packets based on their Quality of Service (QoS), and/or to perform other packet processing operations.

Memory 126 may comprise one or more of the following types of memory: semiconductor firmware memory, programmable memory, non-volatile memory, read only memory, electrically programmable memory, random access memory, flash memory (e.g., SRAM), magnetic disk memory, and/or optical disk memory. Either additionally or alternatively, memory 126 may comprise other and/or later-developed types of computer-readable memory. Machine readable firmware program instructions may be stored in memory 126. These instructions may be accessed and executed by the integrated circuit 120. When executed by the integrated circuit 120, these instructions may result in the integrated circuit 120 performing the operations described herein as being performed by the integrated circuit.

Figure 2:
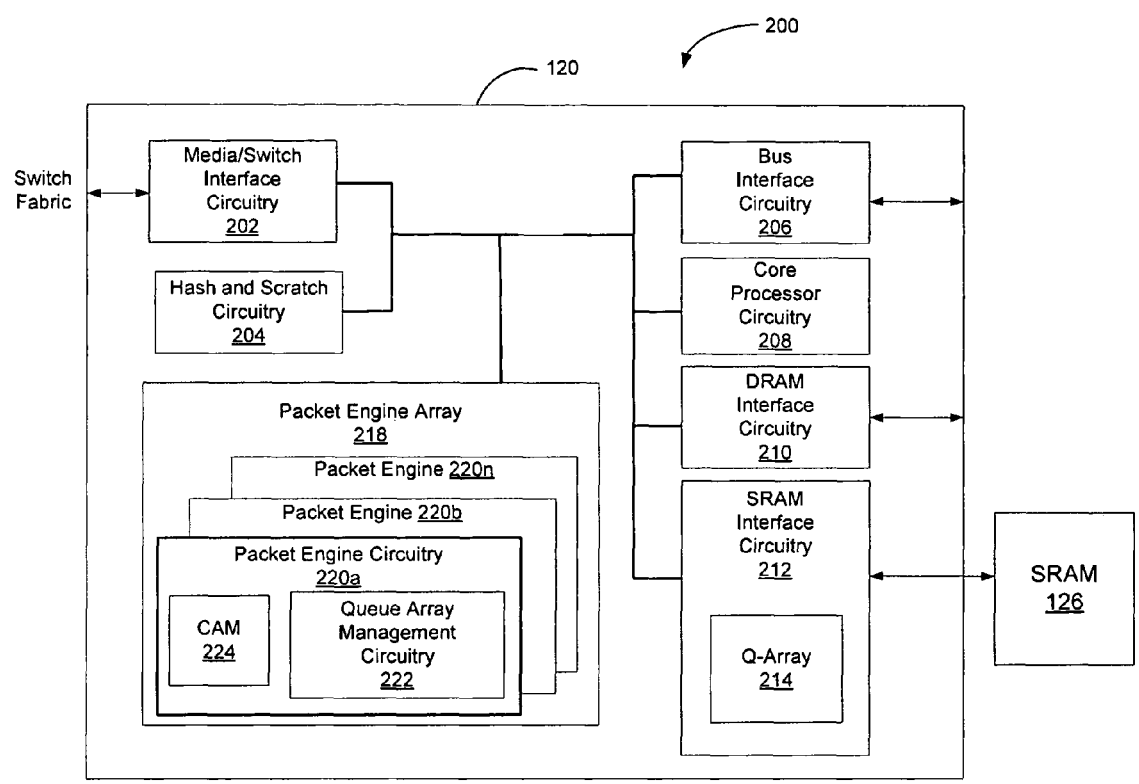
FIG. 2 is a diagram illustrating in more detail the integrated circuit of FIG. 1 according to one embodiment.

FIG. 2 is a diagram illustrating in more detail the integrated circuit 120 of FIG. 1 according to one embodiment. In FIG. 2, certain portions of the system 100 depicted in FIG. 1 have been omitted for clarity (for example, external devices 104, 106 and 108 and networks 110, 112), but it is to be understood that like parts of FIG. 2 can be implemented in a manner consistent with an embodiment depicted in FIG. 1, or alternatively in other system implementations, without departing from this embodiment. In this embodiment, integrated circuit 120 may include features of an Intel® Internet eXchange network processor (IXP). However, the IXP network processor is only provided as an example, and the operative circuitry described herein may be used in other network processor designs (for example, in alternative embodiments) or any caching system or in any system requiring mapping of a big set of consecutively arranged items by a lesser set pointing to the same.

The IC 120 may includes media/switch interface circuitry 202 (e.g., a CSIX interface) capable of sending and receiving data to and from devices connected to the integrated circuit such as physical or link layer devices, a switch fabric, or other processors or circuitry. As used in any embodiment described herein, "circuitry" may comprise, for example, singly or in any combination, hardwired circuitry, programmable circuitry, state machine circuitry, and/or firmware that stores instructions executed by programmable circuitry. Thus, components of the IC 120 may include hardware, software and/or firmware to perform the functions described herein. The IC 120 may also include hash and scratch circuitry 204 that may execute, for example, polynomial division (e.g., 48-bit, 64-bit, 128-bit, etc.) in hardware to conserve clock cycles that are typically needed in a software implemented hash function.

The IC 120 may also include bus interface circuitry 206 (e.g., a peripheral component interconnect (PCI) interface) for communicating with another processor such as a microprocessor (e.g. Intel Pentium®, etc.) or to provide an interface to an external device such as a public-key cryptosystem (e.g., a public-key accelerator) to transfer data to and from the IC 120 or external memory. The IC may also include core processor circuitry 208. In this embodiment, core processor circuitry 208 may comprise circuitry that may be compatible and/or in compliance with the Intel® XScale™ Core microarchitecture described in "Intel® XScale™ Core Developers Manual," published December 2000 by the Assignee of the subject application. Of course, core processor circuitry 208 may comprise other types of processor core circuitry without departing from this embodiment. Core processor circuitry 208 may perform "control plane" tasks and management tasks (e.g., look-up table maintenance). Alternatively or additionally, core processor circuitry 208 may perform "data plane" tasks (which may be typically performed by the packet engine array 218, described below) and may provide additional packet processing threads. The DRAM interface circuitry 210 may control read/write access to external DRAM (not shown).

Integrated circuit 120 may also include a packet engine array 218. The packet engine array may include a plurality of packet engines 220a, 220b, . . . , 220n. Each packet engine may provide multi-threading capability for executing instructions from an instruction set (such as a reduced instruction set computing (RISC) architecture). For example, for efficient processing RISC instructions may not include floating point instructions or instructions for integer multiplication or division commonly provided by general purpose processors. Each packet engine in the array 218 may include e.g., eight threads that interleave instructions executing thus increasing efficiency and making more productive use of the packet engine resources that might otherwise be idle. In some arrangements, the multi-threading capability of the packet engine array 218 may be supported by hardware that reserves different registers for different threads and quickly swaps thread contexts. The packet engines may communicate among each other, for example, by using neighbor registers in communication with an adjacent engine or engines or by using shared memory space.

Each packet engine in the array 218 may be capable of quickly executing processes such as packet verifying, packet classifying, packet forwarding, and so forth, while leaving more complicated processing to the core processor circuitry 208. Each packet engine in the array 218 may also include multiple threads (e.g., eight threads) that interleave execution of instructions. When a thread is executing instructions, and experiences a break point, i.e., a break in processing that would incur a relatively large latency before resuming execution, such as the need to perform a memory access, another thread included in the packet engine may execute instructions to maintain a nearly constant number of instructions executed per second.

Integrated circuit 120 may also include SRAM interface circuitry 212 that may be capable of controlling read and write access to external SRAM 126. External SRAM 126 may comprise a plurality of queues for storing packets. Each queue in SRAM 216 may include a queue descriptor. A "queue descriptor" may include pointer information for the start and end of the queue, and may also include queue count information (e.g., the number of packets in the queue). SRAM interface circuitry 212 may also include a Q-Array 214. The Q-Array 214 may include a plurality of registers for storing respective queue descriptors associated with the queues in the SRAM 126.

The following description is in reference to operations associated with packet engine 220a. However, it should be understood that other packet engines (e.g., 220b, . . . , 220n) may operate in a similar manner as described herein with reference to packet engine 220a. Packet engine 220a may include a content addressable memory (CAM) 224 and queue array management circuitry 222. The CAM 224 may include a plurality of registers. The registers may store pointer information to point to one or more register locations in the Q-Array 214. As will be described in greater detail below, queue array management circuitry 222 may be capable of controlling the SRAM interface circuitry 212 to map (cache) one or more queue descriptors (from SRAM 126) into one or more register locations in the Q-Array 214.

Packet engine 220a may be capable of searching the Q-Array 214 to determine, for example, the location of a particular queue in SRAM 126. The queue descriptors in the Q-Array 214 permit the packet engine 220a to quickly determine the location of a queue in SRAM 126. When a packet is received by packet engine 220a, the packet engine 220a may determine which particular queue in SRAM 126, among the plurality of queues in SRAM 126, to store the packet. When a packet is stored in a queue SRAM 126, a queue descriptor for that queue may be moved to a register location in the Q-Array 214 and a pointer may be placed in the CAM 224 of the packet engine 220a pointing to one or more locations of the Q-Array 214. These operations may enable, for example, the packet engine 220a to access, via the CAM 224, the queue and location of the packet in SRAM 126 without having to search the SRAM 126 directly.

As stated, the register entries in the CAM 224 may point to one or more locations in the Q-Array 214. Thus, to search the Q-Array 214, packet engine 220a may search the CAM 224. In operation, packet engine 220a may be capable of searching the registers in the CAM 224 in parallel (i.e., within a single clock cycle). Accordingly, the number of register entries in the CAM 224 may be smaller than the number of register entries in the Q-Array 214. For example, in one embodiment, the CAM 224 may have 16 registers capable of storing 16 register entries while the Q-Array may have 64 registers capable of storing 64 queue descriptors.

To permit the smaller number of register entries in the CAM 224 to point to a larger number of queue descriptors in the Q-Array 214, queue array management circuitry 222 may be capable of grouping together a plurality of queues in SRAM 216, assigning a group tag to the plurality of group descriptors, and storing said group tag in a register location in the CAM 224. For example, as shown in the FIG. 3, a plurality of queues may be grouped together to form a group and may be identified by a group tag, e.g., group tag 0, . . . , group tag n. In addition, once a queue in SRAM 126 is assigned to a group tag, queue array management circuitry 224 may be capable of controlling the SRAM interface circuitry 212 to copy the queue descriptor corresponding to that queue into a register location in the Q-Array 214. The location of the queue descriptor in the Q-Array 214 may be based on, for example, the group tag number and the location of the group tag in the CAM 224.

Figure 3:
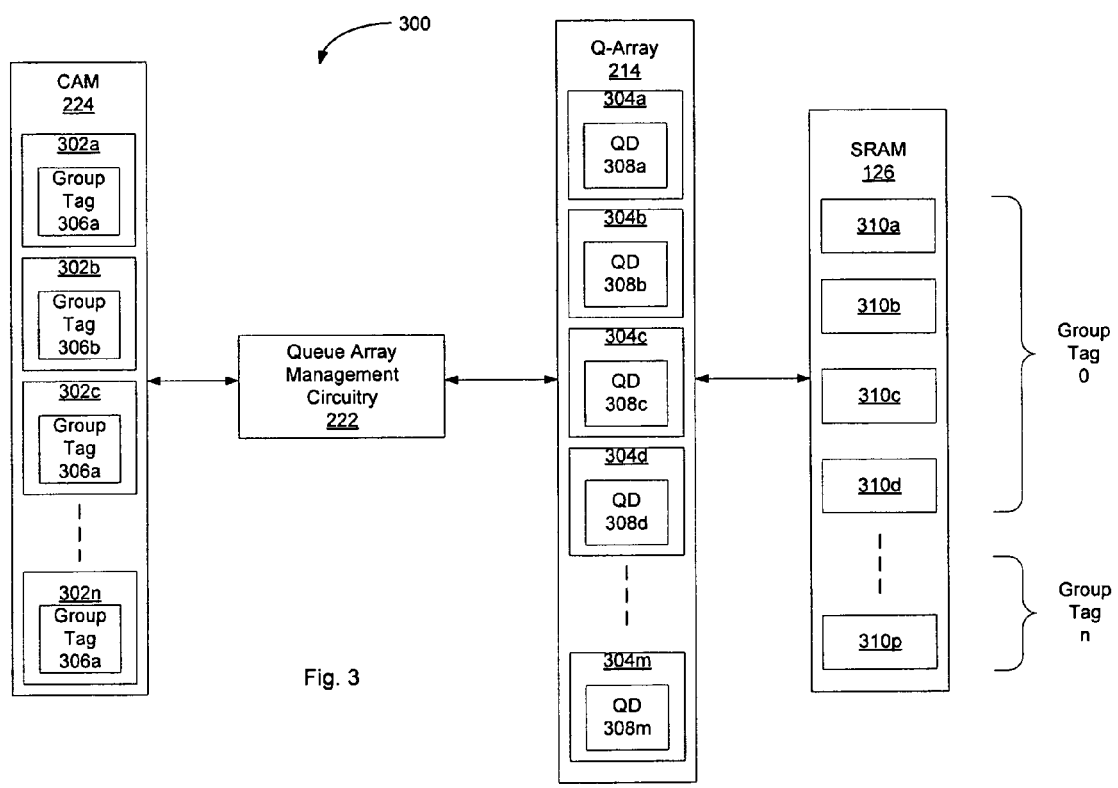
FIG. 3 depicts in more detail portions of the integrated circuit of FIGS. 1 and 2.

FIG. 3 depicts in more detail portions of the integrated circuit 120 of FIGS. 1 and 2. In FIG. 3, certain portions of the system 100 and the integrated circuit 200 depicted in FIGS. 1 and 2, respectively, have been omitted for clarity (for example, external devices 104, 106 and 108 and networks 110, 112), but it is to be understood that like parts of FIG. 3 can be implemented in a manner consistent with an embodiment depicted in FIG. 1 or 2, or alternatively in other system implementations, without departing from this embodiment.

As described above, the CAM 224 may include a plurality of register entries 302a, 302b, 302c, . . . , 302n. The register entries 302a, 302b, 302c, . . . , 302n of the CAM 224 may be referred to herein by a numerical identification number, for example, register entry 0, 1, 2, . . . , n. The Q-Array 214 may include a plurality of register entries 304a, 304b, 304c, 304d, . . . , 304m. The register entries 304a, 304b, 304c, 304d, . . . , 304m of the Q-Array 214 may be referred to herein by a numerical identification number, for example, register entries 0, 1, 2, 3, . . . , m. In this embodiment, m is larger than n (m>n), i.e., the number of registers in Q-Array 214 is greater than the number of registers in the CAM 224. Each register 304a, 304b, 304c, 304d, . . . , 304m of the Q-Array 214 may be capable of storing a respective queue descriptor (QD) 308a, 308b, 308c, 308d, . . . , 308m. Each QD may points to one queue in SRAM 126.

SRAM 126 may include a plurality of queues, for example, 310a, 310b, 310c, 310d, . . . , 31pm. The queues 310a, 310b, 310c, 310d, . . . , 300p of the SRAM 126 may be referred to herein by a numerical identification number, for example, queue 0, 1, 2, 3, . . . , p. A specific numerical example for m and n is provided below.

Figure 4:
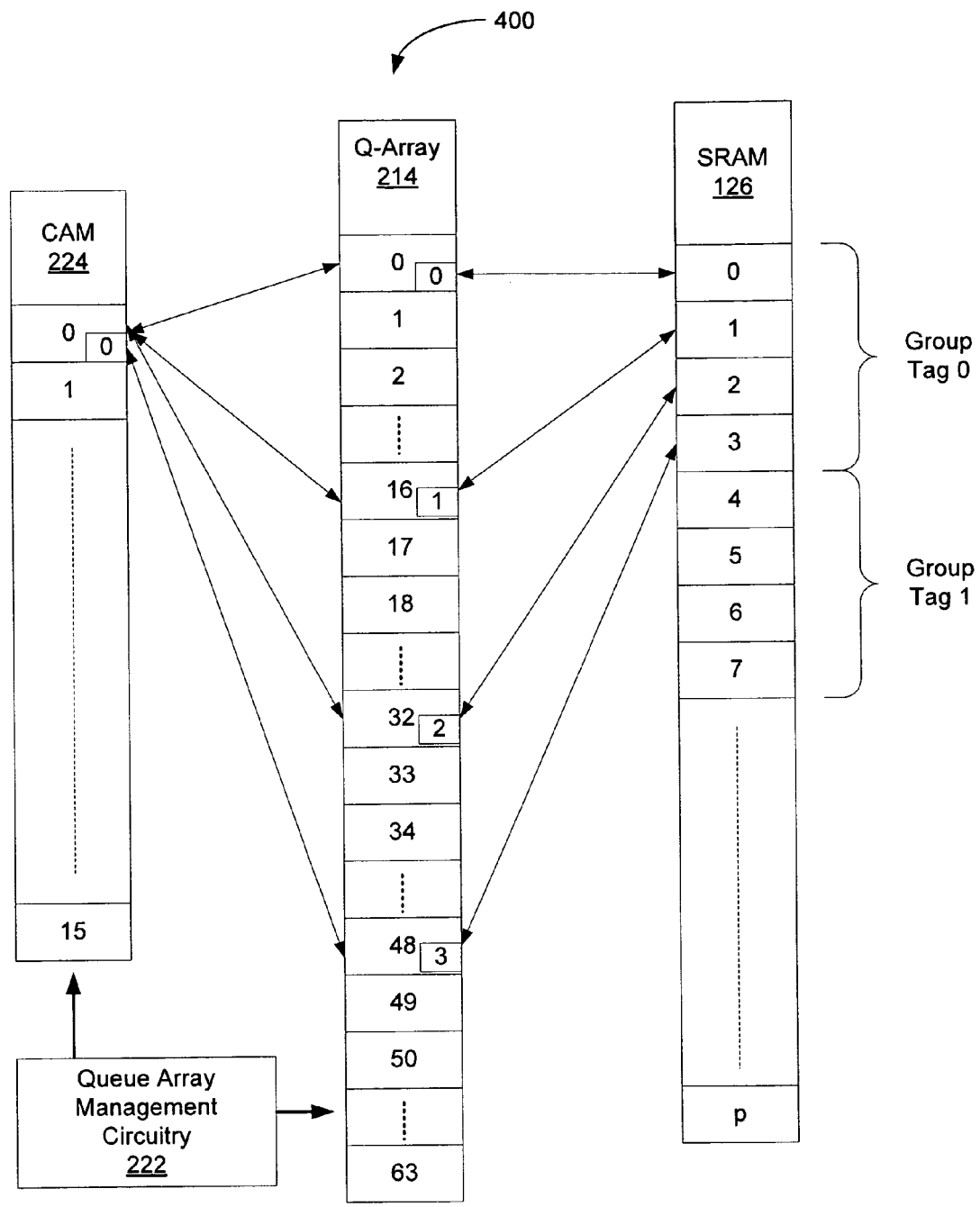
FIG. 4 depicts in more detail memory operations of the integrated circuit of FIGS. 1 and 2, and provides a numerical example for the description of FIG. 3.

FIG. 4 depicts in more detail memory operations 400 of the integrated circuit 120 of FIGS. 1 and 2, and provides a numerical example for the description of FIG. 3. In FIG. 4, certain portions of the system 100 and the integrated circuit 200 depicted in FIGS. 1 and 2, respectively, have been omitted for clarity (for example, external devices 104, 106 and 108 and networks 110, 112), but it is to be understood that like parts of FIG. 3 can be implemented in a manner consistent with an embodiment depicted in FIG. 1 or 2, or alternatively in other system implementations, without departing from this embodiment. This embodiment depicts a specific example of mapping operations between a Q-Array having 64 registers and a CAM having 16 registers (i.e., m=64, n=16).

In this example there are 16 register entries in the CAM 224. Each respective register entry in the CAM 224 may be represented by a binary sequence, for example, 0000, 0001, 0010, . . . , 1111, corresponding to CAM register entry 0, 1, 2, . . . , 15, respectively. Also, in this example, there are 64 register entries in the Q-Array 214. Accordingly, each respective register entry in Q-Array 214 may be represented by a binary sequence, for example, 000000, 000001, 000010, . . . , 111111, corresponding to Q-Array register entry 0, 1, 2, 3, . . . , 63. Also in this example, there may be p number of queues in the the SRAM 126, labeled 0, 1, 2, 3, 3, . . . , p. As described above, the CAM 224 may permit a packet engine to search the queue descriptors stored in the Q-Array 214, which in turn, may point to specific queue locations in SRAM 126. This may enable, for example, the packet engine to determine the location of a data packet in the SRAM 126.

When a packet is received by integrated circuit 120, packet engine 220a may determine which queue in SRAM 126 to store the packet (based on, for example, information contained in the header of the packet). A queue descriptor for that queue may be stored in the SRAM 126. In response to a packet being stored in the determined queue in SRAM 126, queue array management circuitry 222 may assign a group tag to a set of queues (that may include the current queue), and store the group tag in a register entry of the CAM 224. Additionally, queue array management circuitry 222 may control the Q-Array 214 to move the queue descriptor of all the queues in the group into register locations in the Q-Array 214 so that, for example, the group tag in the CAM points to the register locations in the Q-Array 214 containing the queue descriptor for all queues in the group.

Assigning a Group Tag

A group tag may be based on, at least in part, the number of queues in the SRAM 126 (and/or the number of register entries in the Q-Array 214) relative to the number of register entries in the CAM 224. In this example, there are 4 times as many register entries in the Q-Array 214 as there are register entries in the CAM 224 (i.e., 4n=m). To permit the CAM 224 to fully search and utilize all of the registers of the Q-Array 214, queue array management circuitry 222 may group four sequential queues in the SRAM 126 and assign a group tag to that group of queues. For example, queues 000000, 000001, 000010 and 000011, corresponding to queues 0, 1, 2 and 3, may be grouped together and assigned one group tag (designated as group tag 0 in the Figure). Likewise, queues 000100, 000101, 000110 and 000111, corresponding to queues 4, 5, 6 and 7, may be grouped together and assigned one group tag (designated as group tag 1 in the Figure). This process may continue for all of the queues in the SRAM 126.

To assign a particular group tag, queue array management circuitry 222 may be capable of Boolean operations to associate a group of queues in SRAM 126 to a single group tag. For example, queue array management circuitry 222 may be capable of performing a 2-bit logical right-shift operations (>>2) on the queue number binary sequence to generate a group tag. For example, queue number 000000 may be right shifted by two bits to generate 000000, thus generating a group tag of 0. Likewise, queue numbers 000001, 000010, and 000011, may be right shifted by two bits to generate 000000, thus generating a group tag of 0. Accordingly, group tag 0 is associated with four distinct queues: 000000, 000001, 000010, and 000011 (i.e., queues 0, 1, 2 and 3). Continuing this example, queue numbers 000100, 000101, 000110, and 000111, may be right shifted by two bits to generate 000001, thus generating a group tag of 1.

Thus, for example, if a packet is received and the packet engine determines that the packet is to be stored in queue location 000011, that queue may be assigned a group tag of 0, as described above. This process may be performed for any or all of the queues in the SRAM 126. The group tag, once assigned, may be stored in an available register 0, 1, . . . 15 of the CAM 224. For purposes of this example, it is assumed that the CAM 224 is initialized, i.e., no group tags have been assigned to any of the register entries of the CAM 224. Under this assumption, group tag 0 may be stored in register 0 of the CAM 224. Of course, it should be understood that these parameters and assumptions are given herein for purposes of explanation of some of the operations of the queue array management circuitry 222, and the parameters and assumptions are not intended to limit the scope of this disclosure (indeed, it is further note that this example may be generalized, as described above with reference to FIG. 3). Further, as will be described in greater detail below, each group tag may also point to four distinct registers in the Q-Array 214.

Caching the Queue Descriptors

Once a group tag is assigned to a group of queues in the SRAM 126, the queue descriptors for each of the queues may be moved and/or copied into respective register entries in the Q-Array 214. Since, in the example, four queues are grouped together by a single group tag, the queue descriptors for each queue in the group may be moved to registers in the Q-Array 214.

In one embodiment, the queue descriptors for a particular group may be mapped into respective register entries of the Q-Array 214 based on the order of the queue number of the group of queues and the location of the group tag in the CAM 224. The order of the queue number of the group of queues may be assigned, for example, by the numerical sequence of the queues in the group. Thus, for example, queue 000000 (assigned to group tag 0) may be of order 0, queue 000001 (also assigned to group tag 0) may be of order 1, queue 000010 (also assigned to group tag 0) may be of order 2, and queue 000011 (also assigned to group tag 0) may be of order 3.

In this embodiment, the queue descriptor associated with order 0 of the group may be mapped into the same register location in the Q-Array 214 as the register location in the CAM 224 storing the group tag for that group. In this example, since group tag 0 may be stored in register location 0 of the CAM 224, queue array management circuitry 222 may map the queue descriptor corresponding to queue 0 into register 0 of the Q-Array 214. Queue array management circuitry may map subsequent queue descriptors for a given group into register locations in the Q-Array 214 based on, for example, the following operation:

Q-Array register location=(Order of Queue number in a group*16)+register location of the Group Tag in the CAM.

Accordingly, in this example, since group tag 0 may be stored in register location 0 of the CAM 224, queue array management circuitry 222 may map the queue descriptor corresponding to queue 1 into register 16 of the Q-Array 214, as shown by the arrow in the Figure. Likewise, queue array management circuitry 222 may map the queue descriptor corresponding to queues 2 and 3 into registers 32 and 48, respectively, of the Q-Array 214. Thus, in this example, group tag 0 points to four distinct queue descriptors in the Q-Array 214, which in turn, point to four sequential queues in the SRAM 126.

Thus, as a packet is received a group tag may be generated for the packet. The group tag may correspond to a plurality of queues in the SRAM 126. The group tag may be stored in an available register in the CAM 224. Queue descriptors for each queue in the group of queues may be mapped to registers in the Q-Array 214.

As stated, the queue descriptor associated with order 0 of the group may be mapped into the same register location in the Q-Array 214 as the register location in the CAM 224 storing the group tag for that group. This operation may reduce the processing time to map queue descriptors into the Q-Array, since, at least, the location of the first queue descriptor (queue order 0) may be generated directly from the register location in the CAM 224. However, as can be gathered from the preceding example, there are numerous ways that queue array management circuitry 222 can map queue descriptors into the Q-Array 214. For example, in other embodiments, queue array management circuitry 222 may be capable of mapping each queue descriptor in register location in the Q-Array equal to the register location of the queue in SRAM. Of course, there are numerous other mapping operations which may be employed by the queue array management circuitry 222, and all such alternatives are deemed specific examples of the general principles set forth herein.

Searching the Q-Array

Continuing with this example, and assuming that the queue descriptors for group tag 0 have been mapped into the Q-Array 214, queue array management circuitry 222 may also be capable of searching the Q-Array 214, via the CAM 224. Assume that a new packet arrives into the packet engine, and the packet engine determines that this packet is to be stored in queue number 2 in SRAM 126.

The packet engine may perform a CAM lookup operation to determine if the group tag associated with the new packet exists in the CAM 224. In this example, the new packet belongs in queue number 2, and therefore, as described above, the group tag for this packet—group tag 0 (queue number 2 right shifted by 2 bits)—resides in register 0 of the CAM 224. As previously described, the packet engine may be capable of searching the register entries of the CAM 224 in parallel.

Next, the packet engine may determine where the queue descriptor for this packet resides in the Q-Array 214. To that end, queue array management circuitry 222 may be capable of performing a Boolean operation to determine the location of the queue descriptor. The operation may be similar to the operations described above, and may be of the form:

Location of Queue Descriptor=(Queue Number−group tag<<2)*16+(CAM entry Number) ... 16, in this example, is the number of entries in the CAM.

The queue number for this example is 2, the group tag is 0 and the CAM entry number is 0. Thus, the queue descriptor for queue 2 resides in entry 32 of the Q-Array 214, as shown in the figure.

If, when the packet engine searches the CAM 224, no group tag is found for the new packet, queue array management circuitry 222 may be capable of determining a least recently used (LRU) group tag in the CAM 224. Queue array management circuitry 222 may also be capable of flushing the queue descriptors associated with the queues in the LRU group tag from the Q-Array 214 back to SRAM 126. In addition, queue array management circuitry 222 may be capable of generating a group tag for the queue of the new packet, and the operations described above may be repeated.

Figure 5:
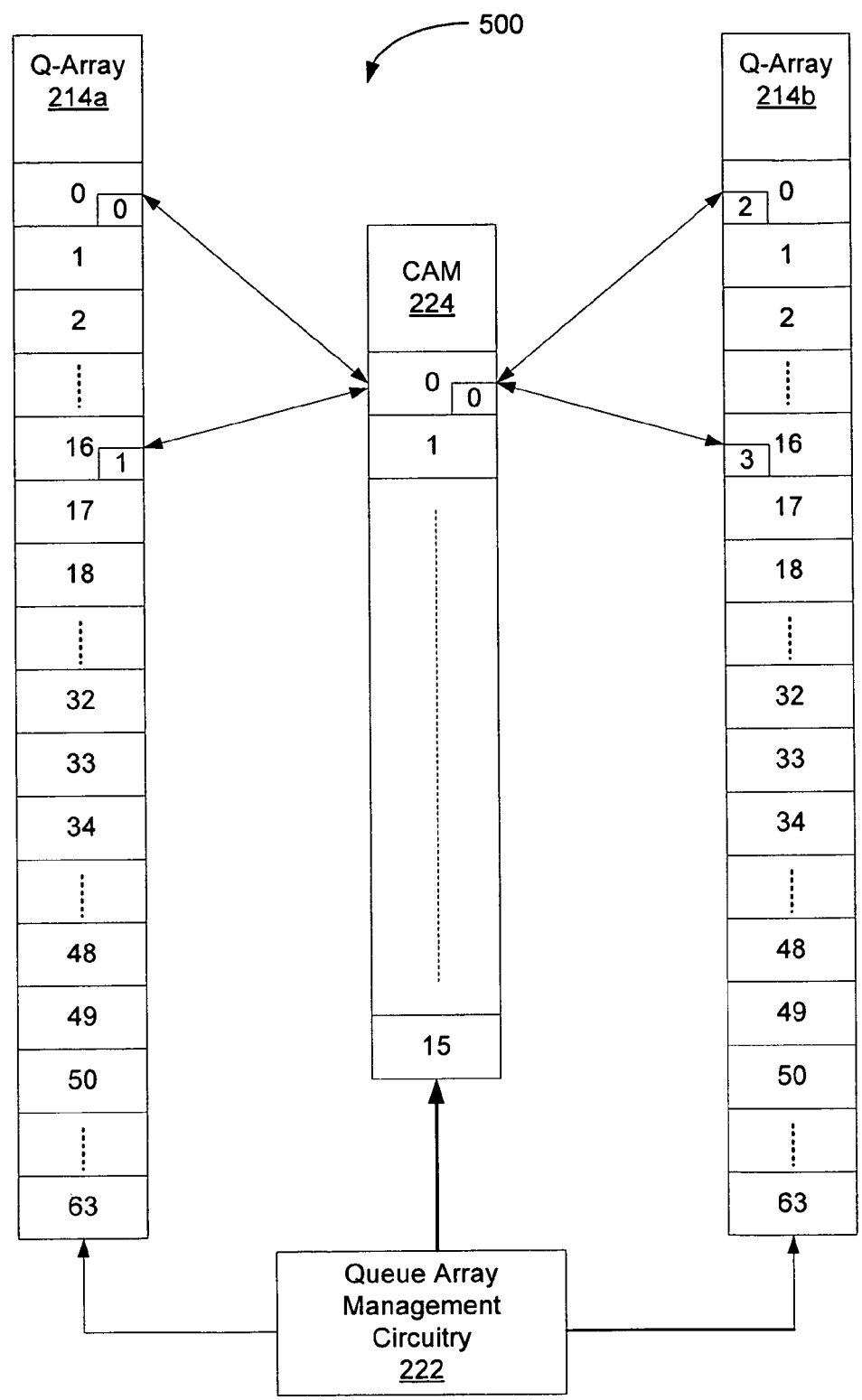
FIG. 5 depicts in more detail another embodiment of memory operations of the integrated circuit of FIGS. 1 and 2, and repeats the numerical example of the description of FIG. 4.

FIG. 5 depicts in more detail another embodiment of memory operations 500 of the integrated circuit 120 of FIGS. 1 and 2, and repeats the numerical example of the description of FIG. 4. In FIG. 5, certain portions of the system 100 and the integrated circuit 200 depicted in FIGS. 1 and 2, respectively, have been omitted for clarity (for example, external devices 104, 106 and 108 and networks 110, 112), but it is to be understood that like parts of FIG. 3 can be implemented in a manner consistent with an embodiment depicted in FIG. 1 or 2, or alternatively in other system implementations, without departing from this embodiment.

In this embodiment, the Q-Array 214 may be divided into two separate channels 214a and 214b. Each respective Q-Array may interface with separate logical and/or physical SRAM channels (not shown in this Figure). Although this embodiment depicts two separate SRAM channels, it is to be understood that this example may be generalized for any number of SRAM channels, without departing from this embodiment.

In this embodiment, queue array management circuitry 222 may be capable of assigning a group tag to incoming data packets as described above with reference to FIG. 4. The queue descriptors for the queues associated with the group tag may be mapped into respective locations in the Q-Array 214a and 214b. In this example, queue descriptors corresponding to queues 0 and 1 may be mapped into respective registers of Q-Array 214a, as described above. However, in this embodiment, queue descriptors corresponding to queues 2 and 3 may be mapped into respective registers of Q-Array 214b, in a manner similar to the locations of queue descriptors 0 and 1. In other words, queue descriptor 2 may be mapped into the same register entry in Q-Array 214b as is done for queue descriptor 0 in Q-Array 214a. Using multiple channels may further reduce processing, since, in the case of two channels, there may be two queue descriptors mapped into the same register location of the Q-Array channels as the group tag in the CAM 224. Mapping queue descriptors into multiple Q-Array channels may be generalized by the following formula:

SRAM channel=(queue number−tag<<2)>>1 and

QD entry=(((queue number−tag<<2)&0x01)*16)+ CAM entry number

Where x=no. of entries in Q-Array/no. of entries in the CAM=64/16=4

$2^y$=4 and thus y=2.

z=y−1=1 p=(x/2)−1=4/2−1=2−1=1

Max No. of entries in the CAM, q=16

Thus the general formula may be set forth as:

SRAM channel=(queue number−tag<<y)>>z and

QD entry=(((queue number−tag<<y)&p)*q)+CAM entry number

Figure 6:
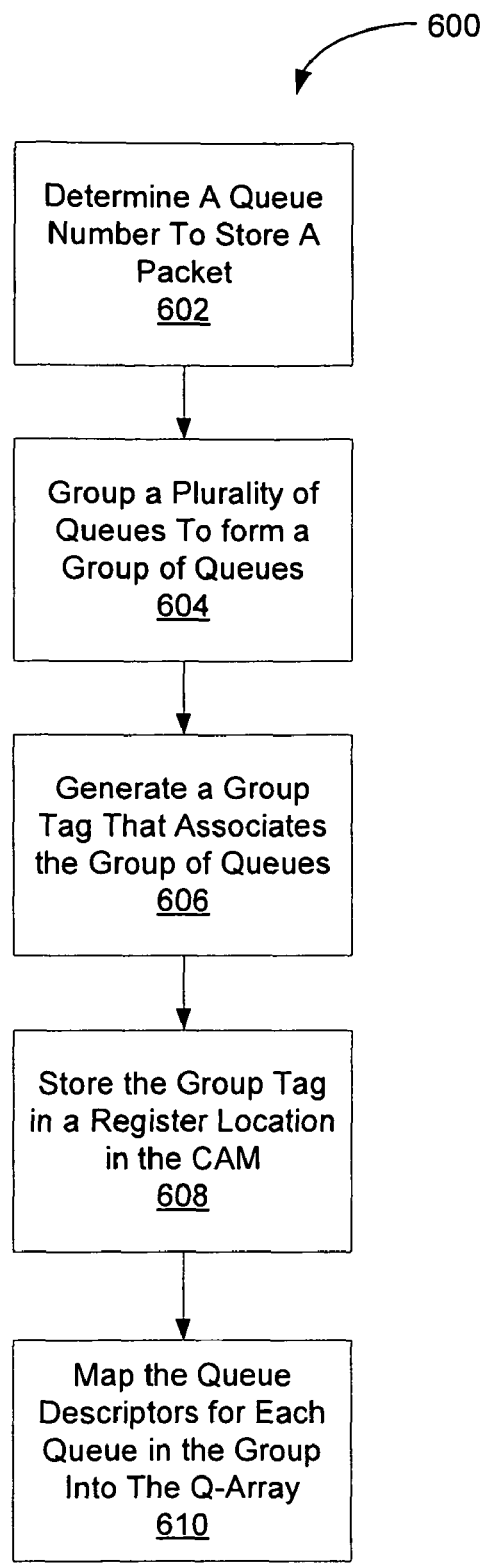
FIG. 6 depicts a flowchart of operations for generating a group tag and mapping the queue descriptors according to one embodiment.

FIG. 6 depicts a flowchart 600 of operations for generating a group tag and mapping the queue descriptors according to one embodiment. In this embodiment, operations may include determining a queue number to store a packet 602. Operations may also include grouping a plurality of queues together to form a group of queues 604. Operations may additionally include generating a group tag that associates the group of queues 606. Operations may further include storing the group tag in a register location in the CAM 606. Operations may also include mapping the queue descriptors for each queue in the group of queues into a queue array 610.

Figure 7:
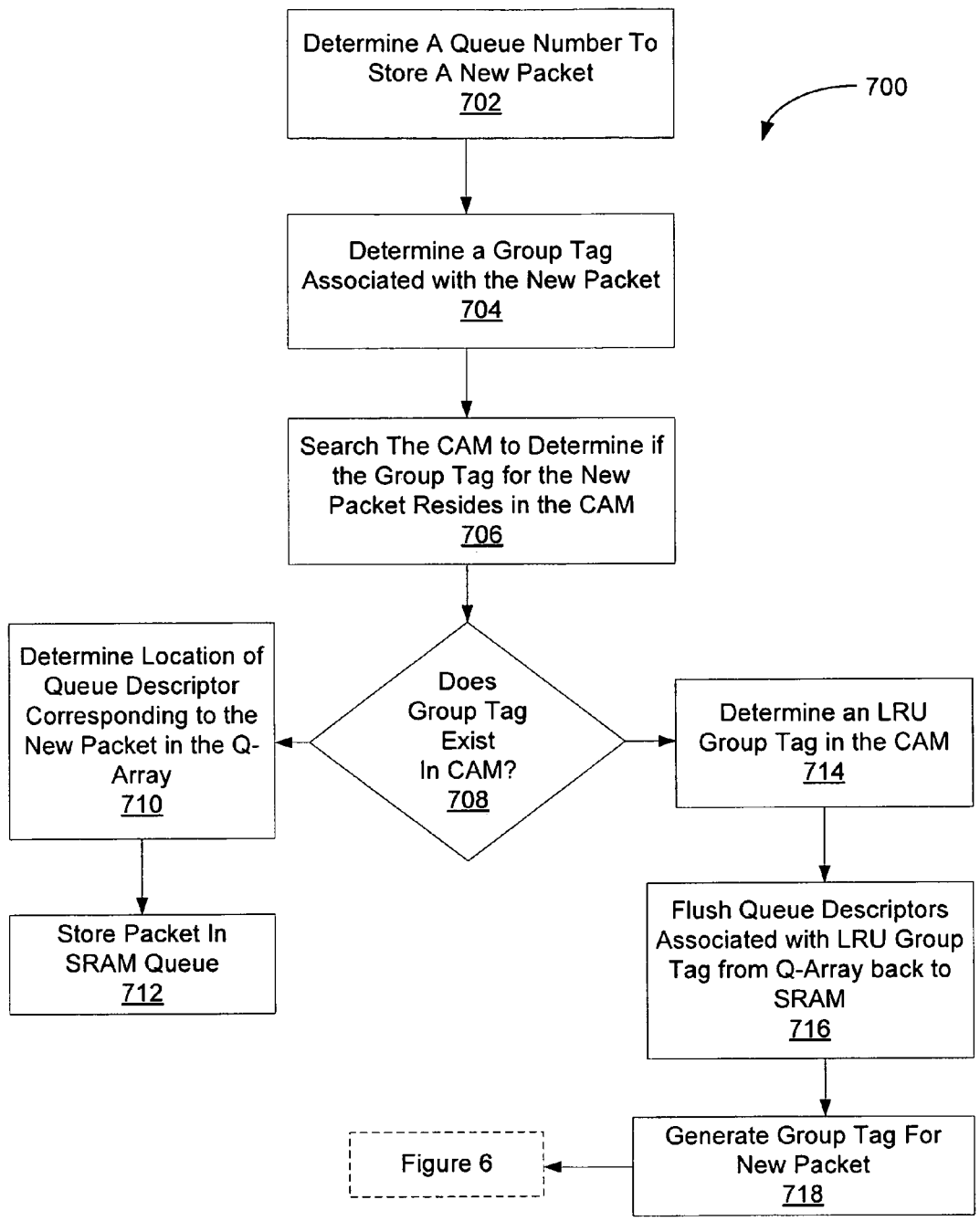
FIG. 7 depicts a flowchart of operations for searching the CAM and the Q-Array according to one embodiment.

FIG. 7 depicts a flowchart 700 of operations for searching the CAM and the Q-Array according to one embodiment. In this embodiment, operations may include determining a queue number to store a new packet 702. Operations may also include determining a group tag associated with the new packet 704. Operations may also include searching the CAM to determine if the group tag for the new packet resides in the CAM 706. If the group tag exists in the CAM 708, operations may include determining the location of the queue descriptor corresponding to the new packet in the Q-Array 710. Operations may also include storing the new packet in the appropriate queue location in SRAM 712. If the group tag does not exist in the CAM 708, operations may include determining an LRU group tag in the CAM 714. Operations may also include flushing the queue descriptors associated with the LRU group tag from the Q-Array back to SRAM 716. Operations may additionally include generating a group tag for the new packet's group 718, which may include one or more operations described above with reference to FIG. 6.

Figure 8:
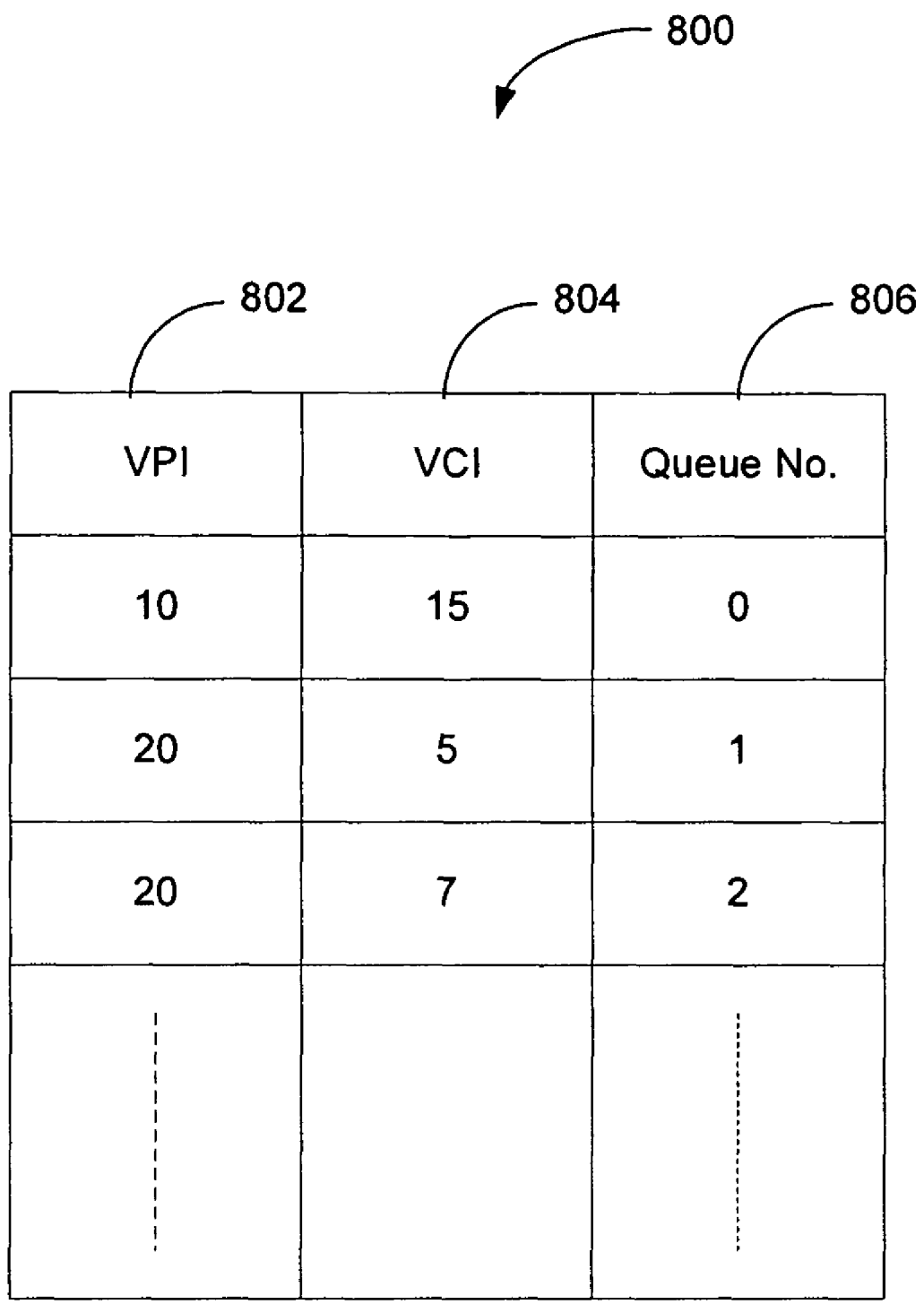
FIG. 8 depicts an ATM cell map.

As stated above, IC 120 may be capable of communicating using a plurality of communication protocols. Asynchronous transfer mode (ATM) may communicate information using "cells". In such an embodiment, the header portion of a cell may include VPI (virtual path identity)/VCI (virtual channel identity) to route the cell to a destination. ATM communication may establish a plurality of virtual channels, as may be identified by the VCI information, to communicate cells. FIG. 8 depicts an ATM cell map 800, which may reside in SRAM 126 for routing ATM cells using ATM communication protocols. ATM map may include VPI 802 and VCI 804 information. Each VPI/VCI pair may be associated with a queue number 806 in SRAM. For example, a cell having a VPI 10 and VCI 15 may be stored in queue number 0.

Figure 9:
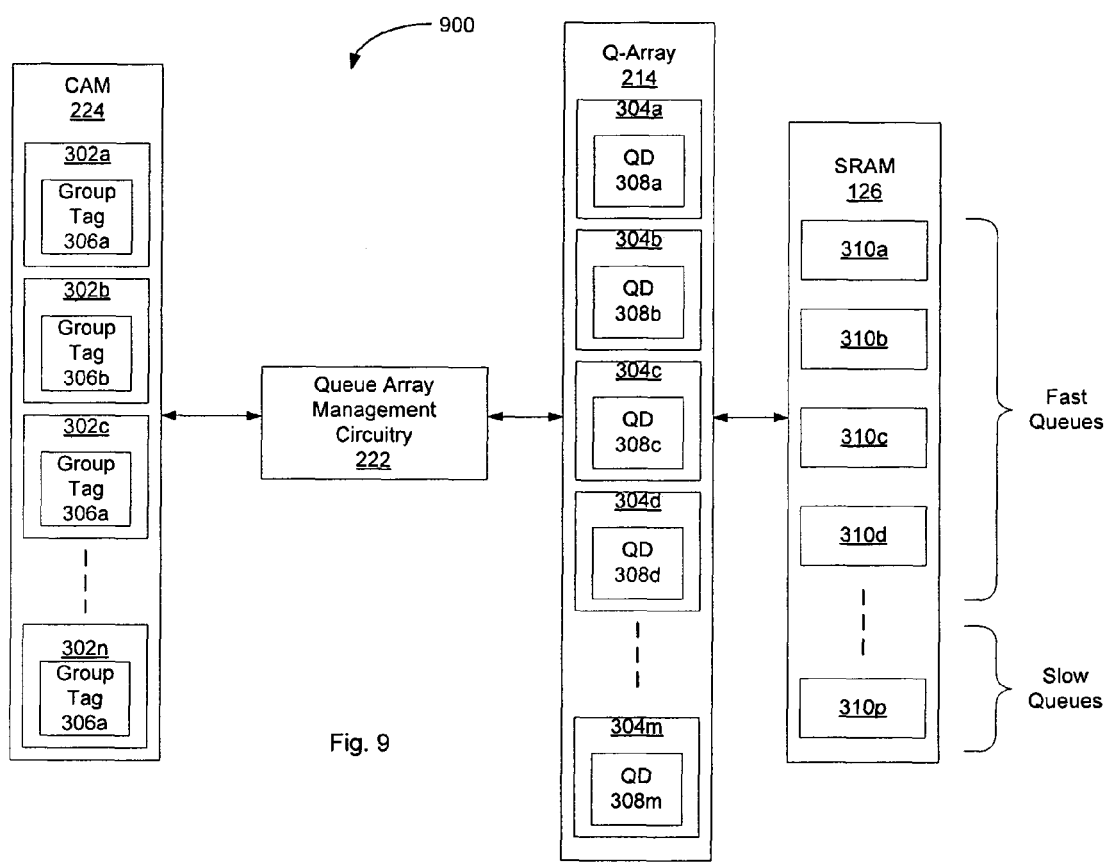
FIG. 9 depicts in more detail portions of the integrated circuit of FIGS. 1 and 2 (similar to FIG. 3), and in particular depicts selected queues designated as "fast queues" and other queues in designated as "slow queues"

Bandwidth may be shared among the channels. In one embodiment, the packet engine may assign different speeds to selected queues. For example, a selected number of queues may be designated as "fast queues" and others as "slow queues". FIG. 9 depicts in more detail portions of the integrated circuit 120 of FIGS. 1 and 2 (similar to FIG. 3), and in particular depicts selected queues in SRAM 126 designated as "fast queues" and other queues in SRAM 126 designated as "slow queues". The "fast queues" may be defined as such because, for example, these may be high-bandwidth queues, as compared to other queues. In such an embodiment, it may be advantageous to cache (map) the queue descriptors into the Q-Array for each of the "fast queues", while the remaining queues may be reserved for other queue descriptor mapping, such as described above.

Figure 10:
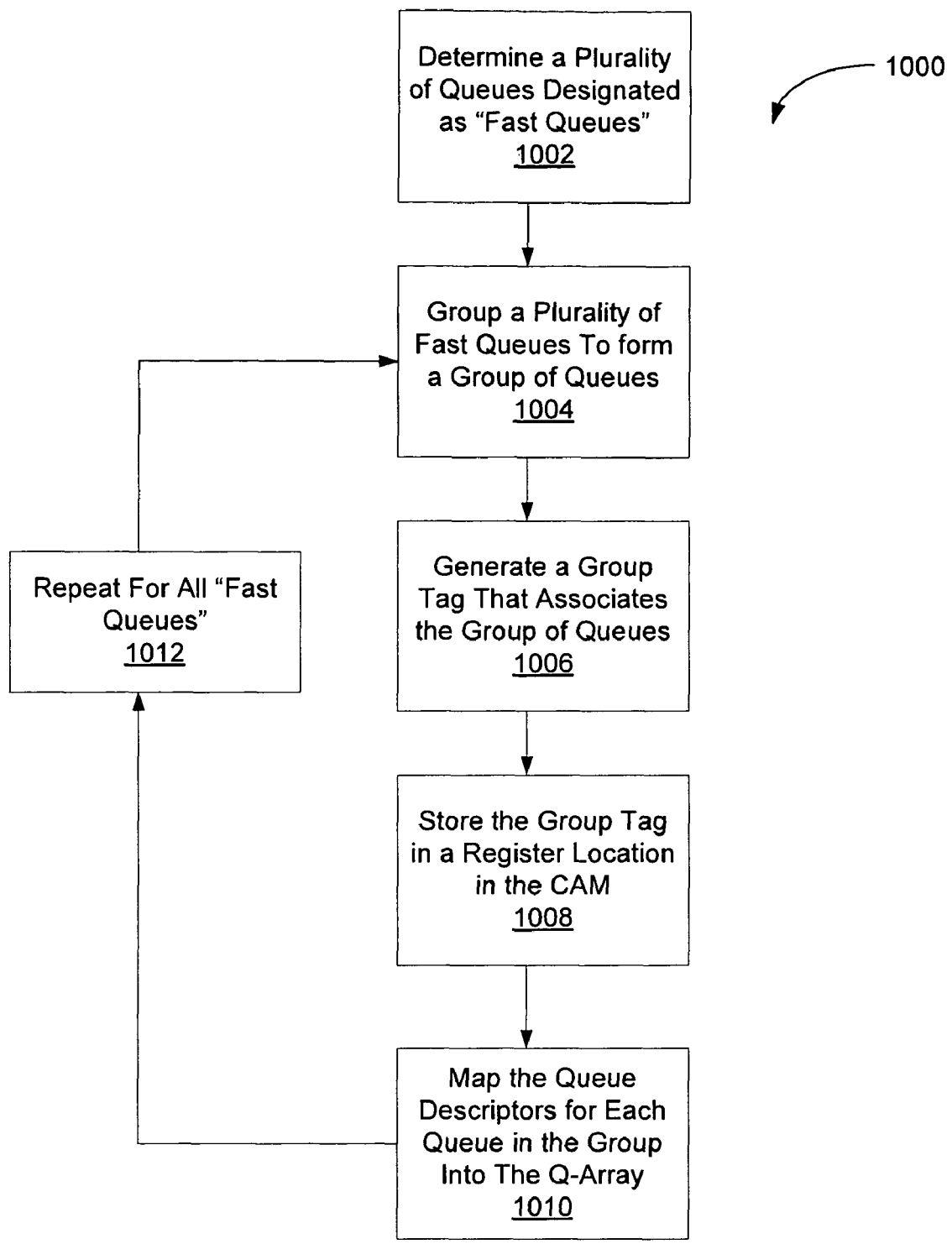
FIG. 10 depicts a flowchart of ATM operations for generating a group tag and mapping the queue descriptors according to one embodiment.

FIG. 10 depicts a flowchart 1000 of ATM operations for generating a group tag and mapping the queue descriptors according to one embodiment. Operations according to this embodiment may include determining a plurality of queues designated as "fast queues" 1002. Operations may also include grouping a plurality of fast queues to form a group of queues 1004. Operations may also include generating a group tag that associates the group of queues 1006. Of course, with respect to this operation, a group tag may be generated as described above with reference to FIGS. 3-7. Operations may also include storing the group tag in a register location in the CAM 1008. Operations may also include mapping the queue descriptors for each queue in the group into the Q-Array 1010. Of course, with respect to this operation, the queue descriptors may be mapped (cached) as described above with reference to FIGS. 3-7. Operations may additionally include repeating the generation of the group tags and mapping the queue descriptors for all of the "fast queues" 1012.

Figure 11:
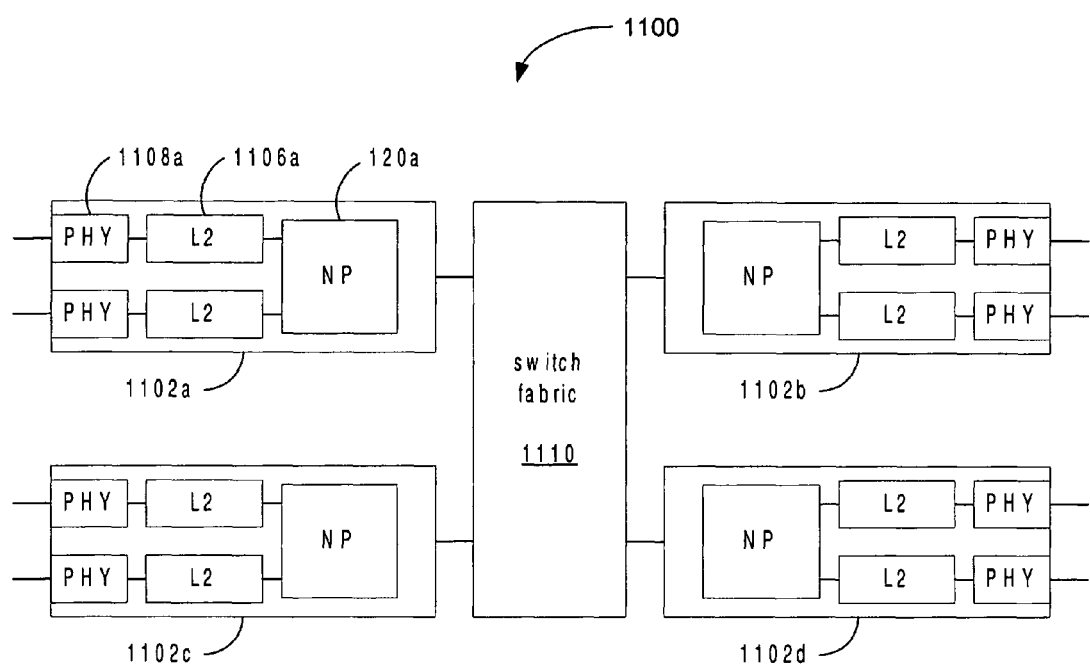
FIG. 11 is a diagram illustrating another system embodiment.

FIG. 11 depicts another system embodiment 1100. This embodiment features a collection of line cards 1102*a*, 1102*b*, 1102*c* and 1102*d* ("blades") interconnected by a switch fabric 1110 (e.g., a crossbar or shared memory switch fabric). The switch fabric 1110, for example, may conform to CSIX or other fabric technologies such as HyperTransport, Infiniband, PCI-X, Packet-Over-SONET, RapidIO, and Utopia.

Individual line cards (e.g., 1102*a*) may include one or more physical layer (PHY) devices 1108*a* (e.g., optic, wire, and wireless PHYs) that handle communication over network connections. The PHYs may translate between the physical signals carried by different network mediums and the bits (e.g., "0"-s and "1"-s) used by digital systems. The line cards may also include framer devices 1106*a* (e.g., Ethernet, Synchronous Optic Network (SONET), High-Level Data Link (HDLC) framers or other "layer 2" devices) that can perform operations on frames such as error detection and/or correction. The line cards shown may also include one or more integrated circuits 120*a*, which may include network processors, and may be embodied as integrated circuit packages (e.g., ASICs). In addition to the operations described above with reference to integrated circuit 120, in this embodiment integrated circuit 120*a* may also perform packet processing operations for packets received via the PHY(s) 1108*a* and direct the packets, via the switch fabric 1110, to a line card providing the selected egress interface. Potentially, the integrated circuit 120*a* may perform "layer 2" duties instead of the framer devices 1106*a*.

In any embodiment described herein, the techniques may be implemented in other hardware, firmware, and/or software. For example, the techniques may be implemented in integrated circuits (e.g., Application Specific Integrated Circuits (ASICs), Gate Arrays, and so forth). Additionally, the techniques may be applied to a wide variety of networking protocols at different levels in a protocol stack and in a wide variety of network devices (e.g., a router, switch, bridge, hub, traffic generator, and so forth).

The term packet was sometimes used in the above description to refer to an IP packet encapsulating a TCP segment. However, a packet may also be a frame, fragment, ATM cell, and so forth, depending on the network technology being used. Additionally, while the description above described network statistics such as packet count and byte count, a variety of other statistics may be handled using techniques described above (e.g., dropped packets, exceptions, and so forth).

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. An apparatus, comprising:
   an integrated circuit (IC) capable of receiving one or more packets from at least one external device and storing one or more packets in at least one queue in external memory, said IC comprising:
   content addressable memory (CAM) comprising a plurality of registers;

memory interface circuitry capable of communicating with the external memory, said memory interface circuitry comprising a queue array capable of storing a plurality of queue descriptors, at least one queue descriptor comprising at least one pointer to point to the location of a queue in said external memory; and queue array management circuitry capable of grouping a plurality of queues to form a group of queues, generating a group tag that associates the group of queues, storing said group tag in a register of the CAM, and mapping the queue descriptors for each queue in the group of queues into the queue array, said group tag pointing to each of the queue descriptors in the queue array.

2. The apparatus of claim 1, wherein:
said IC is further capable of determining a queue number location in the memory to store the one or more packets, and memory interface circuitry is capable of generating said group tag based on, at least on part, the queue number storing the packet.

3. The apparatus of claim 1, wherein:
said queue array management circuitry is further capable of mapping the queue descriptors for each queue in the group of queues into the queue array according to the following formula:
the first queue descriptor is mapped to a register location in the queue array equal to the location where said group tag is stored in said CAM; and
subsequent queue descriptors are mapped into selected locations in the queue away based on, at least in part, the location where said group tag is stored in said CAM and the queue location in memory associated with the queue descriptor.

4. The apparatus of claim 3, wherein if said group tag associated with the new packet does not reside in the CAM, said queue array management circuitry is further capable of:
determining a least recently used (LRU) group tag in the CAM;
flushing the queue descriptors associated with the LRU group tag from the queue array back to memory; and
generating a group tag for a group of queues that includes the queue location for the new packet's queue.

5. The apparatus of claim 1, wherein:
said IC is further capable of:
determining a queue number in memory to store a new packet received by the IC;
determining a group tag associated with the new packet; and
searching the CAM to determine if the group tag associated with the new packet resides in the CAM.

6. The apparatus of claim 5, wherein if said group tag associated with the new packet resides in the CAM, said queue array management circuitry is further capable of:
determining the location of the queue descriptor corresponding to the new packet in the queue array; and
storing the new packet into the queue in memory.

7. The apparatus of claim 1, wherein:
said IC is further capable of determining which queues, among the plurality of queues in memory, are designated as fast queues; and said queue array management circuitry is further capable of generating a group tag for at least one group of fast queues, storing the group tag for the group of fast queues in the CAM; and mapping the queue descriptors for the group of fast queues into the queue array.

8. A method, comprising:
receiving one or more packets from at least one external device and storing one or more packets in at least one queue in memory, said memory comprising a plurality of queues and a plurality of queue descriptors having pointer information to point to a queue;
grouping a plurality of queues to form a group of queues;
generating a group tag that associates the group of queues;
storing said group tag in a register in a content addressable memory (CAM); and
mapping the queue descriptors for each queue in the group of queues into a queue array, said group tag pointing to each of the queue descriptors in the queue array.

9. The method of claim 8, further comprising:
determining a queue number location in the memory to store the one or more packets, and generating said group tag based on, at least on part, the queue number storing the packet.

10. The method of claim 8, wherein:
mapping the queue descriptors for each queue in the group of queues into the queue array is performed according to the following operations:
the first queue descriptor is mapped to a register location in the queue array equal to the location where said group tag is stored in said CAM; and
subsequent queue descriptors are mapped into selected locations in the queue array based on, at least in part, the location where said group tag is stored in said CAM and the queue location in memory associated with the queue descriptor.

11. The method of claim 8, further comprising:
determining a queue number in memory to store a new packet;
determining a group tag associated with the new packet; and
searching the CAM to determine if the group tag associated with the new packet resides in the CAM.

12. The method of claim 11, wherein if said group tag associated with the new packet resides in the CAM, the method further comprising:
determining the location of the queue descriptor corresponding to the new packet in the queue array; and
storing the new packet into the queue in memory. further comprising:
processing each said bit in said master device vector simultaneously.

13. The method of claim 11, wherein if said group tag associated with the new packet does not reside in the CAM, the method further comprising:
determining a least recently used (LRU) group tag in the CAM;
flushing the queue descriptors associated with the LRU group tag from the queue array back to memory; and
generating a group tag for a group of queues that includes the queue location for the new packet.

14. The method of claim 11, further comprising:
determining which queues, among the plurality of queues in memory, are designated as fast queues; and generating a group tag for at least one group of fast queues, storing the group tag for the group of fast queues in the CAM; and mapping the queue descriptors for the group of fast queues into the queue array.

15. An article, comprising:
a tangible storage medium having stored thereon instructions that when executed by a machine results in the following:
receiving one or more packets from at least one external device and storing one or more packets in at least one queue in memory, said memory comprising a plurality of queues and a plurality of queue descriptors having pointer information to point to a queue;

grouping a plurality of queues to form a group of queues;

generating a group tag that associates the group of queues;

storing said group tag in a register in a content addressable memory (CAM); and mapping the queue descriptors for each queue in the group of queues into a queue array, said group tag pointing to each of the queue descriptors in the queue array.

16. The article of claim 15, wherein said instructions that when executed by said machine result in the following additional operations:

determining a queue number location in the memory to store the one or more packets, and generating said group tag based on, at least on part, the queue number storing the packet.

17. The article of claim 15, wherein:

mapping the queue descriptors for each queue in the group of queues into the queue away is performed according to the following additional operations:

the first queue descriptor is mapped to a register location in the queue array equal to the location where said group tag is stored in said CAM; and subsequent queue descriptors are mapped into selected locations in the queue array based on, at least in part, the location where said group tag is stored in said CAM and the queue location in memory associated with the queue descriptor.

18. The article of claim 15, wherein said instructions that when executed by said machine result in the following additional operations:

determining a queue number in memory to store a new packet;

determining a group tag associated with the new packet; and searching the CAM to determine if the group tag associated with the new packet resides in the CAM.

19. The article of claim 18, wherein if said group tag associated with the new packet resides in the CAM, said instructions that when executed by said machine result in the following additional operations:

determining the location of the queue descriptor corresponding to the new packet in the queue array; and storing the new packet into the queue in memory.

20. The article of claim 18, wherein if said group tag associated with the new packet does not reside in the CAM, said instructions that when executed by said machine result in the following additional operations:

determining a least recently used (LRU) group tag in the CAM;

flushing the queue descriptors associated with the LRU group tag from the queue array back to memory; and generating a group tag for a group of queues that includes the queue location for the new packet.

21. The method of claim 15, wherein said instructions that when executed by said machine result in the following additional operations:

determining which queues, among the plurality of queues in memory, are designated as fast queues; and generating a group tag for at least one group of fast queues, storing the group tag for the group of fast queues in the CAM; and mapping the queue descriptors for the group of fast queues into the queue array.

22. A system to process packets received over a network, the system comprising:

multiple line cards, an individual line card including:

at least one physical layer component (PHY); and at least one network processor having multiple packet engine circuits, at least one packet engine circuit capable of:

receiving one or more packets from at least one external device and storing one or more packets in at least one queue in memory, said memory comprising a plurality of queues and a plurality of queue descriptors having pointer information to point to a queue;

grouping a plurality of queues to form a group of queues;

generating a group tag that associates the group of queues;

storing said group tag in a register in a content addressable memory (CAM); and mapping the queue descriptors for each queue in the group of queues into a queue array, said group tag pointing to each of the queue descriptors in the queue array; and a switch fabric interconnecting the multiple line cards.

23. The system of claim 22, wherein:

said packet engine circuit is further capable of determining a queue number location in the memory to store the one or more packets, and generating said group tag based on, at least on part, the queue number storing the packet.

24. The system of claim 22, wherein:

said packet engine circuit is further capable of mapping the queue descriptors for each queue in the group of queues into the queue away according to the following formula:

the first queue descriptor is mapped to a register location in the queue array equal to the location where said group tag is stored in said CAM; and subsequent queue descriptors are mapped into selected locations in the queue away based on, at least in part, the location where said group tag is stored in said CAM and the queue location in memory associated with the queue descriptor.

25. The system of claim 22, wherein:

said packet engine circuit is further capable of:

determining a queue number in memory to store a new packet received by the packet engine circuit;

determining a group tag associated with the new packet; and searching the CAM to determine if the group tag associated with the new packet resides in the CAM.

26. The system of claim 25, wherein if said group tag associated with the new packet resides in the CAM, said packet engine circuit is further capable of:

determining the location of the queue descriptor corresponding to the new packet in the queue array; and storing the new packet into the queue in memory.

27. The system of claim 25, wherein if said group tag associated with the new packet does not reside in the CAM, said packet engine circuit is further capable of:

determining a least recently used (LRU) group tag in the CAM;

flushing the queue descriptors associated with the LRU group tag from the queue array back to memory; and generating a group tag for a group of queues that includes the queue location for the new packet.

28. The system of claim 22, wherein:
said packet engine circuit is further capable of determining which queues, among the plurality of queues in memory, are designated as fast queues; and said queue array management circuitry is further capable of generating a group tag for at least one group of fast queues, storing the group tag for the group of fast queues in the CAM; and mapping the queue descriptors for the group of fast queues into the queue array.

* * * * *